(12) United States Patent
Dolganow et al.

(10) Patent No.: US 7,990,870 B2
(45) Date of Patent: Aug. 2, 2011

(54) PEER-TO-PEER TRAFFIC MANAGEMENT BASED ON KEY PRESENCE IN PEER-TO-PEER CONTROL TRANSFERS

(75) Inventors: Andrew Dolganow, Ottawa (CA); Steve Morin, Ottawa (CA); Jason Rusmisel, Ottawa (CA)

(73) Assignee: Alcatel Lucent, Paris (FR)

( * ) Notice: Subject to any disclaimer, the term of this patent is extended or adjusted under 35 U.S.C. 154(b) by 249 days.

(21) Appl. No.: 12/371,234

(22) Filed: Feb. 13, 2009

(65) Prior Publication Data

US 2010/0208590 A1    Aug. 19, 2010

(51) Int. Cl.
*G06F 15/173* (2006.01)
(52) U.S. Cl. ......... 370/235; 709/223; 709/224; 709/232
(58) Field of Classification Search .......... 370/235–240; 709/223–229, 232; 725/105, 118–119, 135, 725/138, 143–144
See application file for complete search history.

(56) References Cited

U.S. PATENT DOCUMENTS

| | | | |
|---|---|---|---|
| 2007/0297417 A1* | 12/2007 | Cohen et al. | 370/395.42 |
| 2008/0049619 A1* | 2/2008 | Twiss | 370/236 |
| 2008/0219169 A1* | 9/2008 | Sargor et al. | 370/238 |
| 2008/0307081 A1* | 12/2008 | Dobbins et al. | 709/223 |
| 2009/0100487 A1* | 4/2009 | Chang et al. | 725/111 |
| 2009/0238071 A1* | 9/2009 | Ray et al. | 370/235 |

\* cited by examiner

*Primary Examiner* — Hassan Kizou
*Assistant Examiner* — Charles C Jiang
(74) *Attorney, Agent, or Firm* — Kramer & Amado, P.C.

(57) ABSTRACT

Various exemplary embodiments relate to a method and related network element including: receiving a first plurality of packets transmitted between a peer-to-peer (P2P) client and a P2P central entity; performing deep packet inspection (DPI) to extract a key from one or more of the first plurality of packets, the key identifying a P2P content item; receiving a second plurality of packets; performing DPI to extract location information of at least one P2P peer from one or more of the second plurality of packets; detecting at least one subsequent IP flow between the P2P client and the at least one P2P peer using the extracted location information, the at least one subsequent IP flow relating to a transfer of the P2P content item; and performing a traffic management action on the at least one subsequent IP flow.

20 Claims, 7 Drawing Sheets

| Key | Client Information | Peer Information |
|---|---|---|
| 13a51...51309 | 123.45.67.89:6881 | 68.0.111.3:6889<br>192.165.0.3:6900 |
| a31e3...f738a | 128.10.54.103:6346 | 68.255.0.133:6346 |
| ... | ... | ... |

210 — Key
220 — Client Information
230 — Peer Information
240, 250, 260

| Key | Content Description | Action |
|---|---|---|
| 13a51...51309 | Copyrighted Movie | Notify NMS |
| a31e3...f738a | Virus-Infected Document | Drop packets |
| fce16...15af8 | Freeware Software | None |
| ... | ... | ... |

310 — Key
320 — Content Description
330 — Action
340, 350, 360, 370

PEER-TO-PEER TRAFFIC MANAGEMENT BASED ON KEY PRESENCE IN PEER-TO-PEER CONTROL TRANSFERS

TECHNICAL FIELD

Embodiments disclosed herein relate generally to management of traffic in a telecommunications network and, more particularly, to managing transmission of peer-to-peer content over such a network.

BACKGROUND

Modern packet-switched networks accommodate a greater number of users and a larger amount of traffic than ever before. Many users have sought to harness the increased bandwidth and connectivity to other users to exchange large files, such as multimedia content and software. To this end, users often engage in so-called Peer-to-Peer (P2P) transfers, in which data is exchanged directly between users, rather than between the user and a central server. Such an approach is advantageous, as it allows sharing of massive amounts of information without the need for a central server with the requisite storage and bandwidth.

Unfortunately, P2P transfers can have a significant impact on the Quality of Experience of other users in the network. As an example, a typical BitTorrent transfer may establish hundreds or even thousands of connections to other peers in the network. Establishing this many connections uses up available bandwidth in transmission lines and burdens the network equipment used to route the packets to the appropriate destination. As the number of users of P2P software has increased, the negative effects on service provider networks have multiplied.

Service providers have been forced to address these problems caused by P2P transfers. Given the significant expenses associated with adding additional equipment, service providers are reluctant to address the P2P problem by simply increasing the capacity of the network. Furthermore, increasing capacity may not be a solution at all, as P2P transfers have the potential to overwhelm any amount of available bandwidth.

As a result, service providers have started to regulate transmission of P2P traffic over their networks. Service providers initially treated all P2P traffic as suspect and gave other transfers preferential treatment over P2P traffic. Such an approach has resulted in significant legal problems for service providers. For example, in the United States, the Federal Communications Commission (FCC) has held that Internet Service Providers (ISPs) must not discriminate against all P2P traffic, as it violates users' rights to select applications and content of their choice. "Net-neutrality" advocates, those who support fair and equal access to the Internet, have mounted similar legal challenges.

Legal problems aside, treating all P2P traffic as suspect operates on a number of false assumptions. First, such an approach assumes that all P2P transfers are illegitimate, when, in actuality, many content owners use P2P as a cheap, efficient way of allowing users to obtain their content. As an example, many freeware or shareware software developers distribute their software using P2P transfers. Second, the initial approach taken by service providers assumes that P2P transfers have no technical benefits. In fact, P2P transfers allow a massive amount of information to be shared without the need for a large infrastructure of content servers.

Thus, it would be desirable to implement a solution that allows service providers to regulate illegal or otherwise illegitimate P2P transfers, while allowing legitimate P2P transfers to continue as usual. Such a solution would allow service providers to minimize the use of bandwidth for illegal P2P transfers, while preserving net neutrality and harnessing the benefits of P2P for legal transfers.

Unfortunately, many P2P software designers and users of such software are aware of efforts by ISPs to regulate P2P transfers and include measures to circumvent such efforts. In particular, many P2P software programs implement encryption, such that the contents of the packets transmitted from a source peer to a destination peer are only discoverable using a decryption key known to the destination peer. In implementations in which a network element inspects the contents of the packets, taking an action based on the encrypted contents of the packets becomes difficult, if not impossible.

Thus, it would be further desirable to implement a solution that allows ISPs to selectively regulate illegal or otherwise illegitimate P2P transfers, even when the data transmissions between clients are encrypted. In particular, there is a need for a solution that regulates P2P transfers based on the unencrypted information exchanged in order to establish a connection.

For the foregoing reasons and for further reasons that will be apparent to those of skill in the art upon reading and understanding this specification, there is a need for management of encrypted P2P transfers based on the underlying content.

SUMMARY

In light of the present need for management of P2P transfers based on the underlying content, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network element for managing transmission of peer-to-peer content. In particular, a network element may receive a first and second plurality of packets transmitted between a peer-to-peer (P2P) client and a P2P central entity. One or more deep packet inspection (DPI) devices may then perform DPI to extract a key from one or more of the first plurality of packets, the key identifying a P2P content item. As an example, the first plurality of packets may relate to a query sent by a P2P client to a P2P central entity to determine the location of peers that maintain the content item. The DPI device(s) may then perform DPI to extract location information of at least one P2P peer (e.g., IP address and port of the peers) from one or more of the second plurality of packets. As an example, the second plurality of packets may relate to a response sent by the P2P central entity to the P2P client.

Then, the DPI device(s) may detect at least one subsequent IP flow between the P2P client and the at least one P2P peer using the extracted location information, the at least one subsequent IP flow relating to a transfer of the P2P content item. Finally, based upon the detection of the at least one subsequent flow, the network element may perform a traffic management action on the at least one subsequent flow.

It should be apparent that, in this manner, various exemplary embodiments enable content-specific management of P2P transfers over a network, even when the transfers between the client and peers are encrypted. In particular, by extracting peer information from a response sent by a P2P central entity, a DPI-equipped network element may monitor for subsequent transfers of data between the client and the peers, then regulate such transfers.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1A:
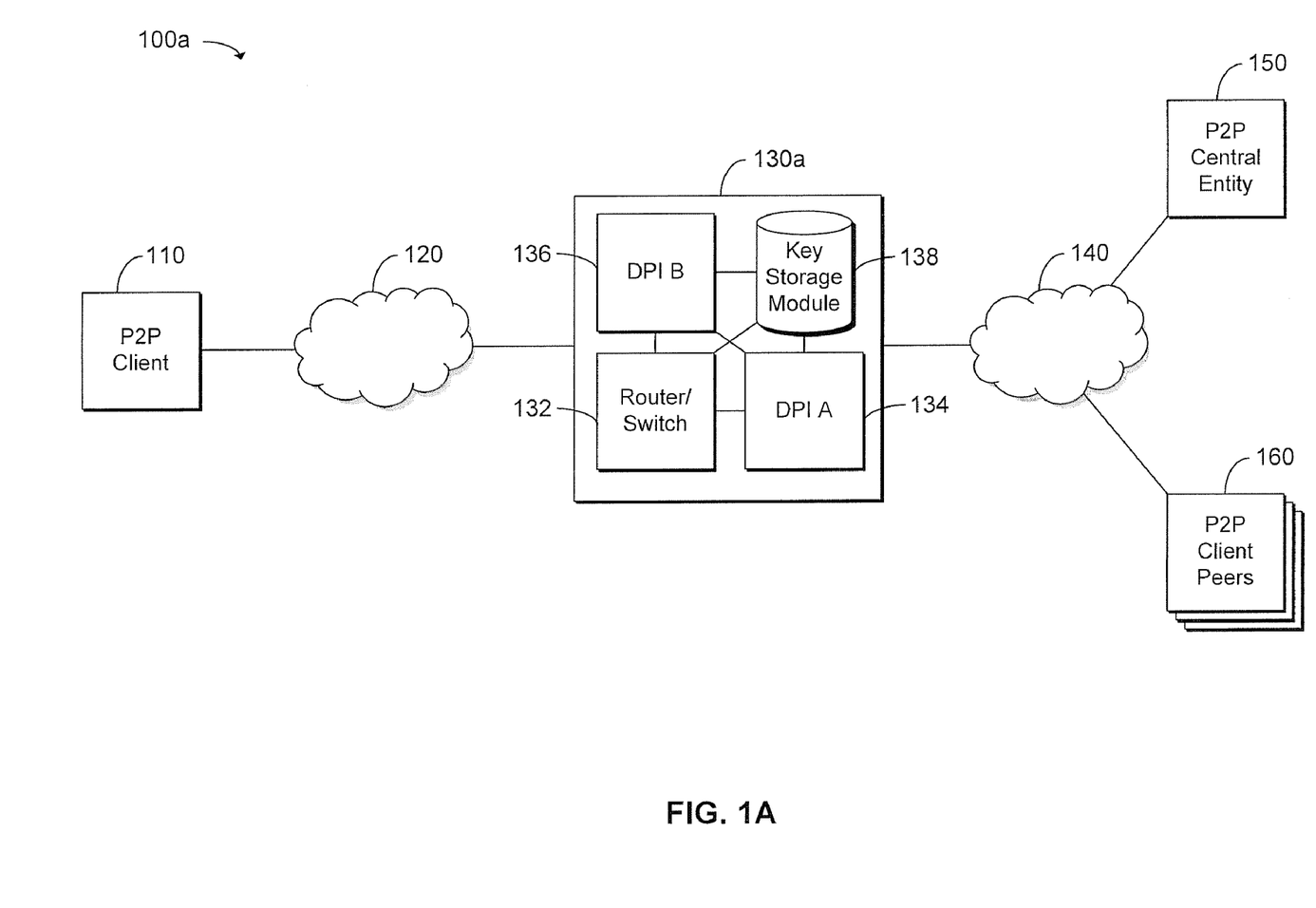
FIG. 1A is a schematic diagram of an exemplary network including a network element configured to perform content identification on a P2P control exchange.

FIG. 1A is a schematic diagram of an exemplary network 100a including a network element 130a configured to perform content identification on a P2P transfer. Network 100a may include a P2P client 110, a first packet-switched network 120, a network element 130a, a second packet-switched network 140, one or more P2P central entities 150, and a plurality of P2P client peers 160. Network element 130a may include a router or switch 132, a first deep packet inspection (DPI) device A 134, a second DPI device B 136, and a key storage module 138.

In various exemplary embodiments, P2P client 110 may be a device operated by a user that enables access to network 100a. More specifically, in various exemplary embodiments, P2P client 110 may be a cell phone, personal or laptop computer, wireless email device, or any other device that supports P2P transfers of data. For example, P2P client 110 may be configured to receive and transmit data according to any P2P protocol known to those of skill in the art, including, but not limited to, BitTorrent, Gnutella, and Fast Track.

Packet-switched network 120 may provide a connection between P2P client 110 and network element 130a. Network 120 may be any network capable of sending data and requests between P2P client 110 and network element 130a. Accordingly, network 120 may comprise a plurality of routers, switches, bridges, and other components suitable for receiving and forwarding data packets.

Network element 130a may be an entity containing components configured to receive, process, and forward packets belonging to an IP flow received from packet-switched network 120. As an example, network element 130a may be owned and/or operated by an Internet Service Provider (ISP) providing services to P2P client 110. Network element 130a may include a router/switch 132, DPI A 134, DPI B 136, and key storage module 138.

Router/switch 132 of network element 130a may include hardware, instructions encoded on a machine-readable medium, or a combination thereof, such that router/switch 132 may be configured to receive and forward packets. Thus, router/switch 132 may include components to receive a packet from P2P client 110, determine the destination of the packet, and forward the packet toward the appropriate destination. Router/switch 132 may be coupled to at least one of DPI A 134 and DPI B 136, such that the DPI devices 134, 136 may process the packets before they are forwarded toward their destination.

DPI devices 134, 136 may include hardware, instructions encoded on a machine-readable medium, or a combination thereof, such that DPI devices 134, 136 may be configured to examine data packets received by router/switch 132 to identify information associated with the packets. In particular, DPI devices 134, 136 may examine any combination of information in Layers 2 through 7 of the Open Systems Interconnection (OSI) model in order to identify an application protocol and P2P key associated with a data flow.

It should be apparent that a number of arrangements of DPI devices 134, 136 may be used. For example, DPI A 134 and/or DPI B 136 may be standalone devices or may be integrated into router/switch 132. Other suitable arrangements will be apparent to those of skill in the art.

Key storage module 138 may be a machine-readable medium storing a predetermined mapping between P2P keys and a corresponding traffic management action. Key storage module 138 may optionally store a description of the content to indicate, for example, whether the P2P key relates to a video file, audio file, application, or the like. An exemplary data arrangement used for key storage module 138 is described in further detail below with reference to FIG. 2. The information in key storage module 138 may be populated in accordance with Co-Pending Application Serial No. 12/371,140. "Apparatus and Method for Generating a Database that Maps Metadata to P2P Content" to Dolganow et al., incorporated by reference herein.

Packet-switched network 140 may provide a connection between network element 130a, P2P central entity 150, and P2P client peers 160. Network 140 may be any network capable of sending data and requests between network element 130a, P2P central entity 150, and P2P client peers 160. Accordingly, as with first network 120, second network 140 may comprise a plurality of routers, switches, bridges, and other components suitable for receiving and forwarding data packets.

P2P central entity 150 may be a system configured to respond to queries from P2P client 110 and P2P client peers 160. In particular, P2P central entity 150 may store a database of information maintained within a particular P2P network, such that a user may search P2P central entity 150 to determine the location of desired content based on the file key. As an example, P2P central entity 150 may be a BitTorrent tracker configured to receive a request including an info_hash from P2P client 110 and respond with a list containing location information of P2P client peers 160 that maintain the requested P2P content. As described in further detail below, the actions performed by network element 130a may be based on the transmission of a request to and reply from P2P central entity 150, and subsequent connections by P2P client 110 to one or more peers 160 identified in the reply.

P2P client peers 160 may be devices operated by users that support P2P transfers of data to P2P client 110. Thus, as with P2P client 110, P2P client peers 160 may be cell phones, personal or laptop computers, wireless email devices, or any other devices that support peer-to-peer transfers of data. For example, P2P client peers 160 may be configured to receive and transmit data according to any P2P protocol known to those of skill in the art, provided that the peers 160 communicate using the same protocol as P2P client 110.

P2P client peers 160 may be configured to receive a request for data from P2P client 110, and then transmit the data to P2P client 110 over network 100a. As an example, when the P2P protocol is BitTorrent, P2P client 110 and one or more of P2P client peers 160 may engage in a handshake, in which P2P client 110 sends a handshake message including the info_hash corresponding to the requested content. Assuming the P2P client peer 160 has the corresponding content, the P2P client peer 160 returns a handshake message including the info_hash. The P2P client peer 160 may then begin transmission of the data corresponding to the requested info_hash. The handshake content and the subsequent P2P file content exchange may be encrypted.

Having described the components of network 100a, a brief summary of the operation of network 100a will be provided. It should be apparent that the following description is intended to provide an overview of the operation of network 100a and network element 130a and is therefore a simplification in some respects. The detailed operation of network element 130a will be described in further detail below with reference to FIGS. 4A, 4B, 4C, 5, and 6. Furthermore, although the functionality is described as divided between DPI A 134 and DPI B 136, it should be apparent that all functionality may be performed on a single DPI device (standalone or integrated into router/switch 132) or distributed differently between the DPI devices 134, 136.

In operation, according to the various exemplary embodiments, DPI A 134 may be configured to use deep packet inspection to identify an application protocol associated with an IP flow received by router/switch 132, and then determine whether the application protocol is a P2P protocol. DPI A 134 may accomplish this by, for example, performing pattern-based, statistical, or behavioral analysis of the packets being sent and/or received by a given system and thereby classifying an IP flow as "Peer-to-Peer."

It should be apparent that an IP flow may be any IP flow between P2P client 110 and P2P central entity 150 or P2P client 110 and a P2P client peer 160, as identifiable by IP 5-tuple information, which includes the source IP address, source port, destination IP address, destination port, and protocol of the IP flow. This IP flow may be further tunneled inside another networking layer, such as IP, Ethernet, ATM, and the like.

When the IP flow uses a P2P protocol or the protocol is still unknown, DPI A 134 may transmit the packets belonging to the IP flow to DPI B 136 for further processing. Thus, DPI A 134 may perform initial filtering of traffic that DPI B 136 is to process and filtering of client to peer traffic that DPI B 136 monitors for P2P content exchanges. Conversely, as described below, DPI B 136 may identify and correlate requests and replies between P2P client 110 and P2P central entity 150, extract key and peer information, and instruct DPI A 134 or another device to monitor traffic between P2P client 110 and P2P client peers 160.

In particular, upon receipt of the packets from DPI A 134, DPI B 136 may perform deep packet inspection to monitor for a request from P2P client 110 to P2P central entity 150. This request may be, for example, a request for peer location information of peers that maintain the P2P content corresponding to a key included in the request. DPI B 136 may extract the key from the request and access key storage 138 to determine whether transfers involving the key should be monitored.

It should be apparent that the monitoring performed by DPI A 134 or/and B 136 may involve caching packets until the deep packet inspection can take place. For example, when packets forwarded from DPI A 134 have not yet been positively identified as relating to a P2P protocol, DPI B 136 may temporarily store the packets until the IP flow is properly identified.

As an example of the operation of DPI B 136, if P2P client 110 operates according to the BitTorrent protocol, client 110 may send a request for peer location information to a tracker, which may correspond to P2P central entity 150. This request may include a field known as the info_hash, which is a 20-byte hash uniquely corresponding to the contents of the torrent. Thus, DPI B 136 may extract the info_hash from the request to the tracker, and then determine whether transfers involving the info_hash should be monitored.

DPI B 136 may subsequently perform deep packet inspection to monitor for a reply from P2P central entity 150 to P2P client 110 transmitted in response to the above request. This reply may identify, for example, the location of a number of P2P client peers 160 that maintain the P2P content corresponding to the key included in the request. Upon recognition of the reply across one or more packets, DPI B 136 may extract the peer location information present in the reply and store the location of P2P client peers 160 in key storage module 138 in association with information identifying P2P client 110.

Using this stored information, DPI B 136 may instruct DPI A 134 to subsequently monitor for flows between P2P client 110 and any of the P2P client peers 160. Alternatively, DPI B 136 may instruct network element 130a or a network element in networks 120, 140 to monitor subsequent IP flows between P2P client 110 and any of the P2P client peers 160, without the involvement of DPI A 134 and without filtering of the IP flows into P2P protocol flows and other flows.

Based on the knowledge that P2P client 110 requested peer information relating to a P2P content item and that P2P client peers 160 maintain the content item, DPI A 134 or a network element may infer that any subsequent connections between P2P client 110 and P2P client peers 160 involve a transfer of that item. As described in further detail below, this inference may be strengthened when P2P client 110 has established a connection to more than one of the P2P client peers 160. Upon reaching a conclusion that the P2P content item is being transferred, network element 130a may then take appropriate action on all of the flows. The same action may be applied to all flows or, alternatively, may be determined based on the key of the underlying content item.

It should be apparent from this description of network element 130a that monitoring requests and replies between P2P client 110 and P2P central entity 150 may allow network element 130a to infer the presence of subsequent P2P transfers, even when the key cannot be extracted from the control or data flows between P2P client 110 and P2P client peers 160. This is particularly advantageous when P2P client 110 and P2P client peers 160 encrypt the packet contents, as the DPI devices 134, 136 may be unable to extract the P2P content key from these packets.

Figure 1B:
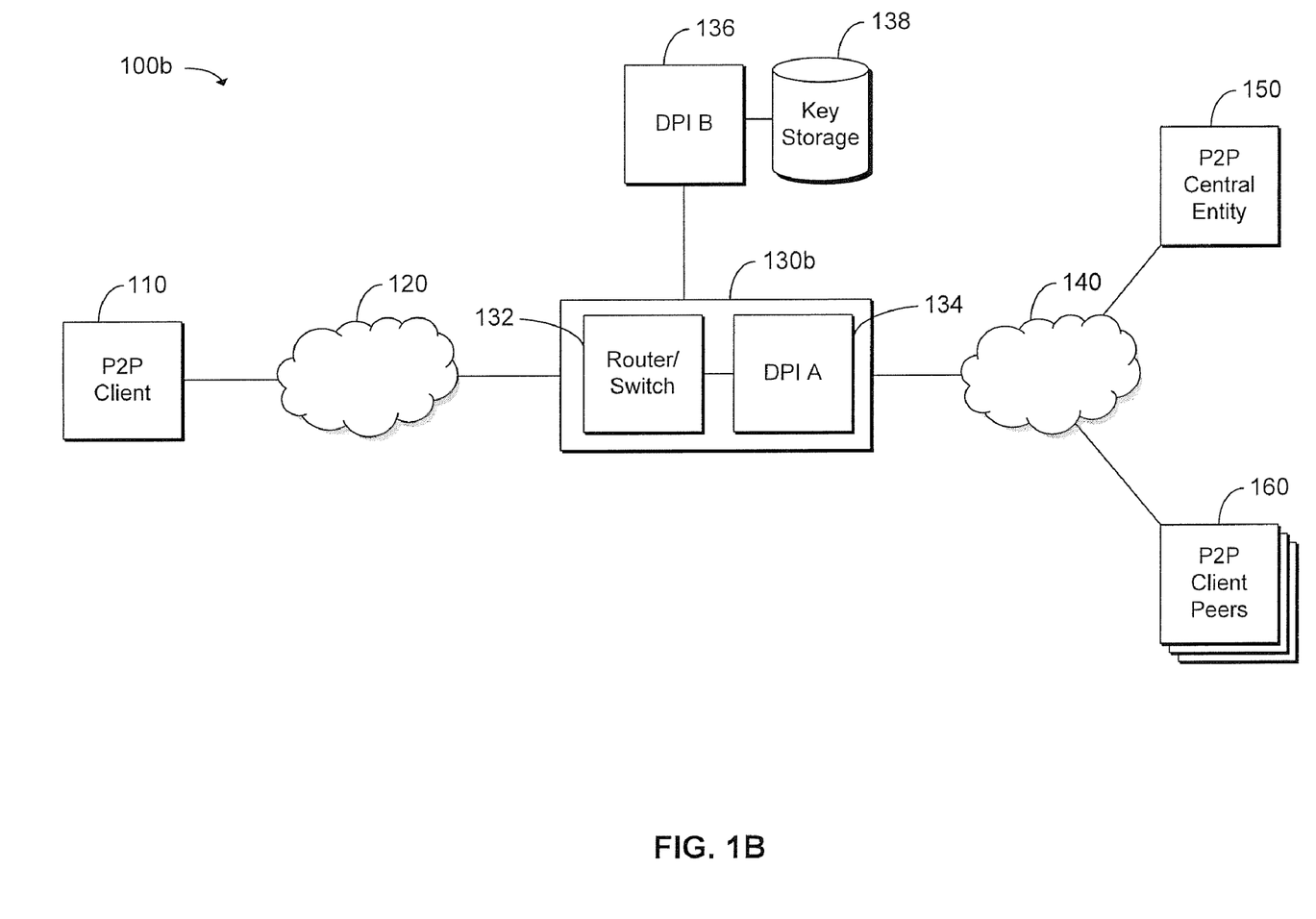
FIG. 1B is a schematic diagram of an exemplary network including a network element coupled to a deep packet inspection device configured to perform content identification on a P2P control exchange.

FIG. 1B is a schematic diagram of an exemplary network 100b including a network element 130b coupled to a deep packet inspection device 136 configured to perform content identification on a P2P transfer. As with network 100a, network 100b may include a P2P client 110, first and second packet-switched networks 120, 140, a P2P central entity 150, and a plurality of P2P client peers 160. Unlike network 100a, network element 130b of network 100b may include only a router/switch 132 and a single DPI A 134. DPI B 136 may be a standalone device connected to network element 130b.

In operation, DPI A 134 and DPI B 136 may perform the functionality described above in connection with FIG. 1A. In order to ensure that DPI B 136 receives the information required to identify the key and peers in the P2P control exchange between P2P client 110 and P2P central entity 150, DPI A 134 may transmit the information to DPI B 136.

This transmission may be accomplished by mirroring (i.e., duplicating) the packets in the IP flow that contain the key from DPI A 134 to DPI B 136. Alternatively, this transmission may be accomplished by redirecting (i.e., rerouting) the packets in the IP flow that contain the key from DPI A 134 to DPI B 136. As another alternative, DPI A 134 may build and send a message including the required information to DPI B 136. Details regarding techniques for transmitting the required information from DPI A 134 to DPI B 136, while minimizing the amount of data transmitted, are described in further detail in Co-Pending Application Serial No. 12/371,079. "Optimized Mirror for P2P Identification" to Dolganow et al., incorporated by reference herein. It should be apparent that the techniques described in this co-pending application are equally applicable to the arrangements of both FIG. 1A and FIG. 1B.

Figure 2:
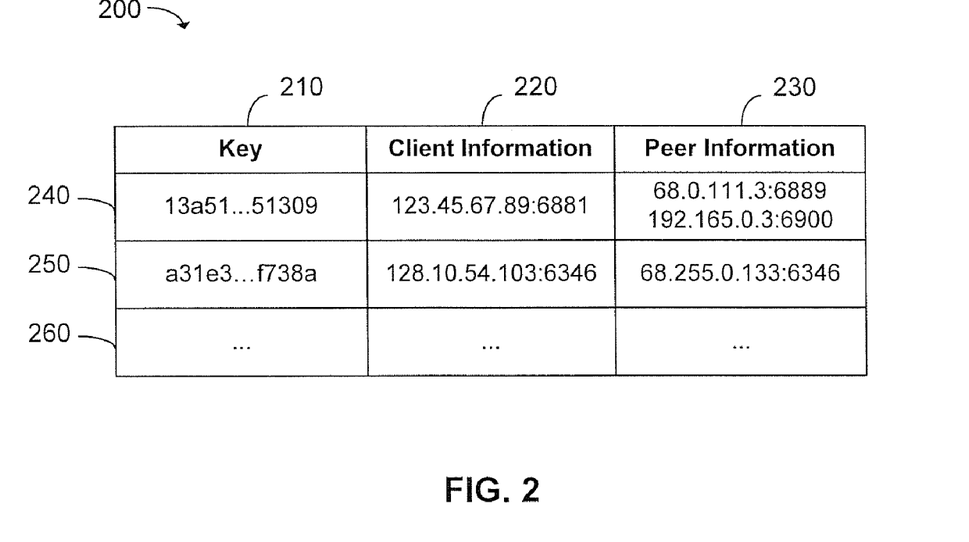
FIG. 2 is a schematic diagram of an exemplary data arrangement used to map a P2P content key to client information and peers corresponding to that client.

FIG. 2 is a schematic diagram of an exemplary data arrangement 200 used to map a P2P content key 210 to client information 220 and peers corresponding to that client 230. Data arrangement 200 may be, for example, a table in a database stored in key storage module 138. Alternatively, data arrangement 200 could be a series of linked lists, an array, or a similar data structure. Thus, it should be apparent that data arrangement 200 is an abstraction of the underlying data; any data structure suitable for storage of this data may be used.

Data arrangement 200 may include three sets of data: a key field 210; a client information field 220; and a peer information field 230. The fields in data arrangement 200 may be populated based upon detection of a request from P2P client 110 to P2P central entity 150 and a corresponding reply from P2P central entity 150 to P2P client 110.

Key field 210 may indicate the value of a key used to uniquely identify a P2P content item. This field 210 may be populated when extracted from a request sent from P2P client 110 to P2P central entity 150, provided that the request includes the key.

Client information field 220 and peer information field 230 may be populated with information extracted from a reply sent from P2P central entity 150 to P2P client 110, provided that the reply indicates location information for one or more P2P client peers 160. As an alternative, client information field 220 may be populated upon receipt of a request sent from P2P client 110 to P2P central entity 150. Fields 220, 230 may indicate any information required to uniquely identify an IP flow between P2P client 110 and a corresponding P2P client peer 160. For example, client information 220 and peer information field 230 may indicate the IP address and port of the P2P client 110 and corresponding P2P client peers 160, respectively. Other suitable information used to identify clients and peers will be apparent to those of skill in the art.

As an example, data entry 240 indicates that the P2P client 110 located at IP address 123.45.67.89, port 6881, has received a message indicating that the content corresponding to the key "13a51 ... 51309" is maintained at the P2P client peers 160 located at IP address 68.0.111.3, port 6889, and IP address 192.165.0.3, port 6900. Similarly, data entry 250 indicates that the P2P client 110 located at IP address 128.10.54.103, port 6346, has received a message indicating that the content corresponding to the key "a31e3 ... f738a" is maintained at the P2P client peer 160 located at IP address 68.255.0.133, port 6346. Data arrangement 200 may include numerous other data entries 260.

Figure 3:
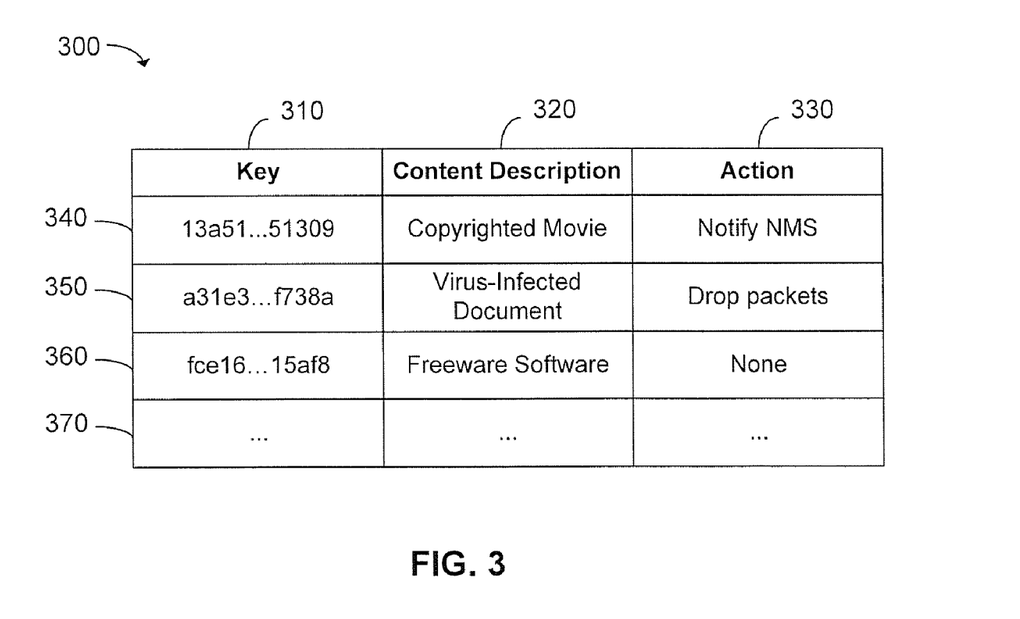
FIG. 3 is a schematic diagram of an exemplary data arrangement used to map a P2P content key to a content description and a traffic management action.

FIG. 3 is a schematic diagram of an exemplary data arrangement 300 used to map a P2P content key 310 to a content description 320 and a traffic management action 330. Data arrangement 300 may be, for example, a table in a database stored in key storage module 138. Alternatively, data arrangement 300 could be a series of linked lists, an array, or a similar data structure. Thus, it should be apparent that data arrangement 300 is an abstraction of the underlying data; any data structure suitable for storage of this data may be used.

Data arrangement 300 may include three sets of data: a key field 310; a content description field 320; and a traffic management action field 330. Key field 310 may indicate the value of a key used to uniquely identify a P2P content item. Optional content description field 320 may indicate a file type, title, or any other information relevant to describing the underlying content item. It should be apparent that content description field 320 is optional, as there is no longer a need for the content description 320 once the key has been identified as matching P2P content and an action has been associated with the key. Traffic management action field 330 may indicate an action to be performed by network element 130a, 130b upon detecting a transmission between a P2P client 110 and at least one P2P client peer 160 including the key.

As an example, data entry 340 indicates that the key is "13a51 ... 51309," that the content corresponding to the key is a copyrighted movie, and that network element 130a, 130b should notify the network management system (NMS) upon detection of a transmission including the key. Data entry 350 indicates that the key is "a31e3 ... f738a," that the content corresponding to the key is a virus-infected document, and that the network element 130a, 130b should drop any packets transmitted with this key. Finally, data entry 360 indicates that the key is "fce16 ... 15af8," that the content corresponding to the key is freeware software, and that the network element 130a, 130b should allow the transfer to proceed as normal upon detection of the key. Data arrangement 300 may include numerous other data entries 370.

Figure 4A:
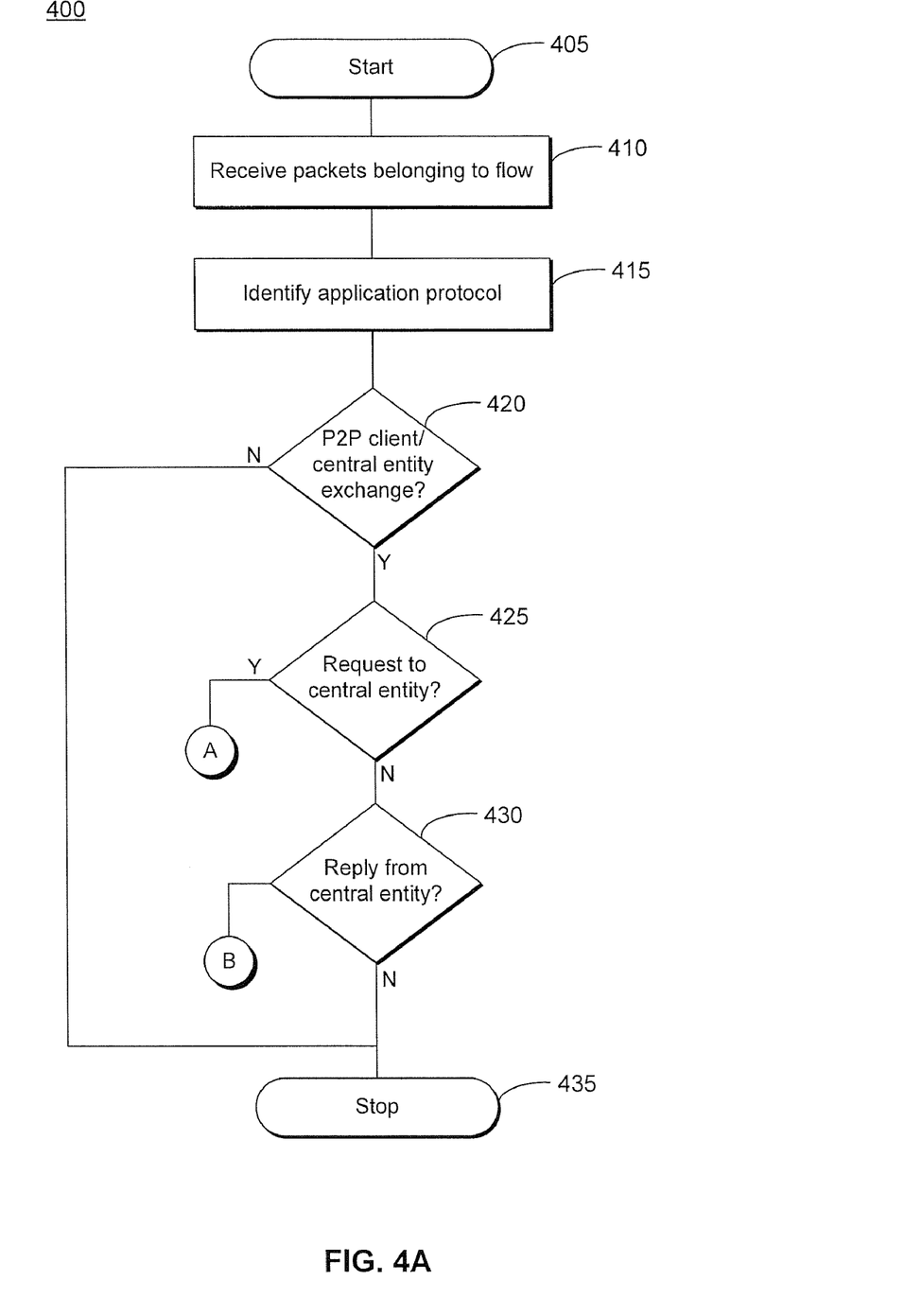
FIG. 4A is a flowchart of an exemplary method of monitoring P2P control exchanges between a P2P client and a P2P central entity.

FIG. 4A is a flowchart of an exemplary method 400 of monitoring P2P control exchanges between a P2P client 110 and a P2P central entity 150. Exemplary method 400 may be performed by the components of networks 100a, 100b to detect the exchange of control messages between P2P client 110 and P2P central entity 150. In the description that follows, the steps are described as performed by one or more specific components of networks 100a, 100b. As will be apparent to those of skill in the art, the steps may be distributed differently among the components of networks 100a, 100b. As an example, all DPI processing may be performed by a single DPI device.

Exemplary method 400 starts in step 405 and proceeds to step 410, where network element 130a, 130b receives a plurality of packets belonging to a flow. As an example, network element 130a, 130b may receive a number of packets belonging to an IP flow between a P2P client 110 and a P2P central entity 150. The packets in the IP flow could be related to, for example, a control exchange used to request and return peer location information indicating P2P client peers 160 that store P2P content desired by P2P client 110.

Exemplary method 400 then proceeds to step 415, where DPI A 134 identifies an application protocol associated with the IP flow using one or more packets belonging to the IP flow or any other related information, such as packets belonging to other flows. In particular, as will be apparent to those of skill in the art, DPI A 134 may analyze any combination of information contained in OSI Layers 2 through 7 of the packets to extract an application protocol associated with the IP flow or the P2P client application.

After DPI A 134 performs processing required for identification of a protocol associated with the flow, exemplary method 400 proceeds to decision step 420, where DPI A 134 determines whether the identified application protocol is a P2P protocol. As an example, DPI A 134 may determine whether the identified protocol belongs to a stored list of P2P protocols, including, for example, BitTorrent, FastTrack, and Gnutella.

In decision step 420, DPI A 134 may further determine whether the exchange is between a P2P client 110 and a P2P central entity 150. DPI A 134 may make this determination by, for example, inspecting the format of the transmitted message. Alternatively, DPI A 134 may determine whether the source or destination address of the packets is the address of a system known to operate as a P2P central entity 150, such as a BitTorrent tracker. Suitable alternatives for determining whether the exchange is between a P2P client 110 and a P2P central entity 150 will be apparent to those of skill in the art.

When, in decision step 420, DPI A 134 determines that the application protocol associated with the IP flow is not a P2P protocol or that the exchange is not between a P2P client 110 and a P2P central entity 150, exemplary method 400 proceeds to step 435, where exemplary method 400 stops. Alternatively, when, in decision step 420, DPI A 134 determines that the application protocol associated with the IP flow is a P2P protocol and that the exchange is between a P2P client 110 and a P2P central entity 150, exemplary method proceeds to decision step 425.

In decision step 425, DPI B 136 determines whether the packets relate to a request for peer location information transmitted from a P2P client 110 to a P2P central entity 150. As described above, DPI B 136 may make this determination by, for example, inspecting the format of the transmitted message. Alternatively, DPI B 136 may determine whether the destination of the packets is the address of a system known to operate as a P2P central entity 150. Again, suitable alternatives will be apparent to those of skill in the art.

When, in decision step 425, DPI B 136 determines that the packets relate to a request for peer location information transmitted from a P2P client 110 to a P2P central entity 150, exemplary method 400 proceeds to the processing of FIG. 4B, described in further detail below. Alternatively, when DPI B 136 determines that the packets do not relate to a request for peer location information, exemplary method 400 proceeds to decision step 430.

In decision step 430, DPI B 136 determines whether the packets relate to a reply including peer location information transmitted from a P2P central entity 150 to a P2P client 110. As described above, DPI B 136 may make this determination by, for example, inspecting the format of the transmitted message. Alternatively, DPI B 136 may determine whether the source of the packets is the address of a system known to operate as a P2P central entity 150. Again, suitable alternatives will be apparent to those of skill in the art.

When, in decision step 430, DPI B 136 determines that the packets relate to a reply including peer location information transmitted from a P2P central entity 150 to a P2P client 110, exemplary method 400 proceeds to the processing of FIG. 4C, described in further detail below. Alternatively, when DPI B 136 determines that the packets do not relate to a reply including peer location information, exemplary method 400 proceeds to step 435, where exemplary method 400 stops.

Figure 4B:
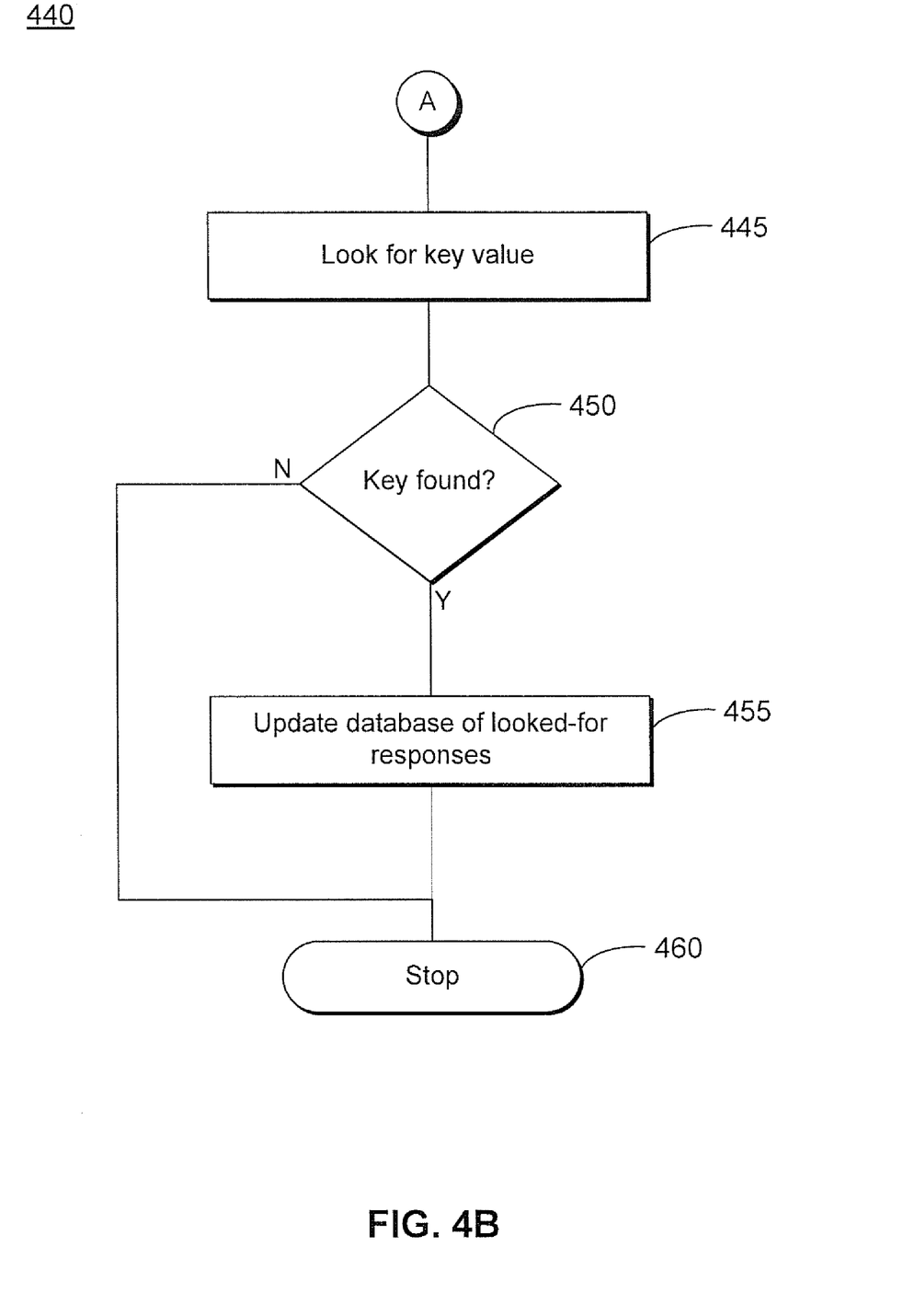
FIG. 4B is a flowchart of an exemplary method of processing a request for peer location information transmitted from a P2P client to a P2P central entity.

FIG. 4B is a flowchart of an exemplary method 440 of processing a request for peer location information transmitted from a P2P client 110 to a P2P central entity 150. As indicated above, the processing of exemplary method 440 may begin upon a determination in decision step 425 of FIG. 4A that the packets relate to a request for peer location information.

In step 445, DPI B 136 performs deep packet inspection on the packets relating to the request to attempt to extract a key identifying the P2P content transmitted in the flow. For example, when the protocol is BitTorrent, DPI B 136 may perform deep packet inspection to determine whether an info_hash field is present in the packets of the flow.

It should be apparent that, DPI B 136 may need to inspect multiple packets in order to extract the key from the IP flow. Thus, DPI B 136 may cache packets, such that multiple packets are used in extracting a key. Furthermore, in some circumstances, DPI B 136 may need to wait until the IP flow is complete before it is able to extract the key. In implementations in which DPI B 136 receives packets from DPI A 134 before the IP flow is positively identified as P2P, DPI B 136 may remove packets from the cache upon identification of the IP flow as non-P2P. As an example, DPI B 136 may trigger removal of these packets from the cache upon receipt of an indication from DPI A 134 that the IP flow is not P2P.

Exemplary method 440 then proceeds to decision step 450, where DPI B 136 determines whether a key identifying the content was located in the packets of the request. In addition to determining whether a key was found in the request itself, DPI B 136 may also query key storage module 138 and, more particularly, data arrangement 300 to determine whether the key relates to a content item for which traffic management is desired. When, in decision step 450, DPI B 136 determines that a key was not found exemplary method 440 proceeds to step 460, where exemplary method 440 stops. Alternatively, when, in decision step 450, DPI B 136 determines that a key was found, exemplary method 440 proceeds to step 455.

In step 455, DPI B 136 marks the IP flow between P2P client 110 and P2P central entity 150 to require subsequent extraction of peer information in a IP flow that will carry a response from P2P central entity 150 to P2P client 110 associated with the given application session. In particular, because DPI B 136 has detected a request for peer information relating to a particular P2P content item, network elements 130*a*, 130*b* may subsequently attempt to extract peer information from the reply sent by P2P central entity 150.

To facilitate subsequent extraction of the peer information, DPI B 136 may, for example, store the extracted key and any information necessary to identify the subsequent reply in key storage module 138. Such information may include, for example, any information necessary to uniquely identify the IP flow between P2P central entity 150 and P2P client 110 that is part of the same application session and any information required to correlate a response to the request. DPI B 136 may further store an indication, such as a Boolean value, specifying that DPI B 136 should extract the peer information from any subsequent reply relating to the extracted key. Exemplary method 440 then proceeds to step 460, where exemplary method 440 stops.

Figure 4C:
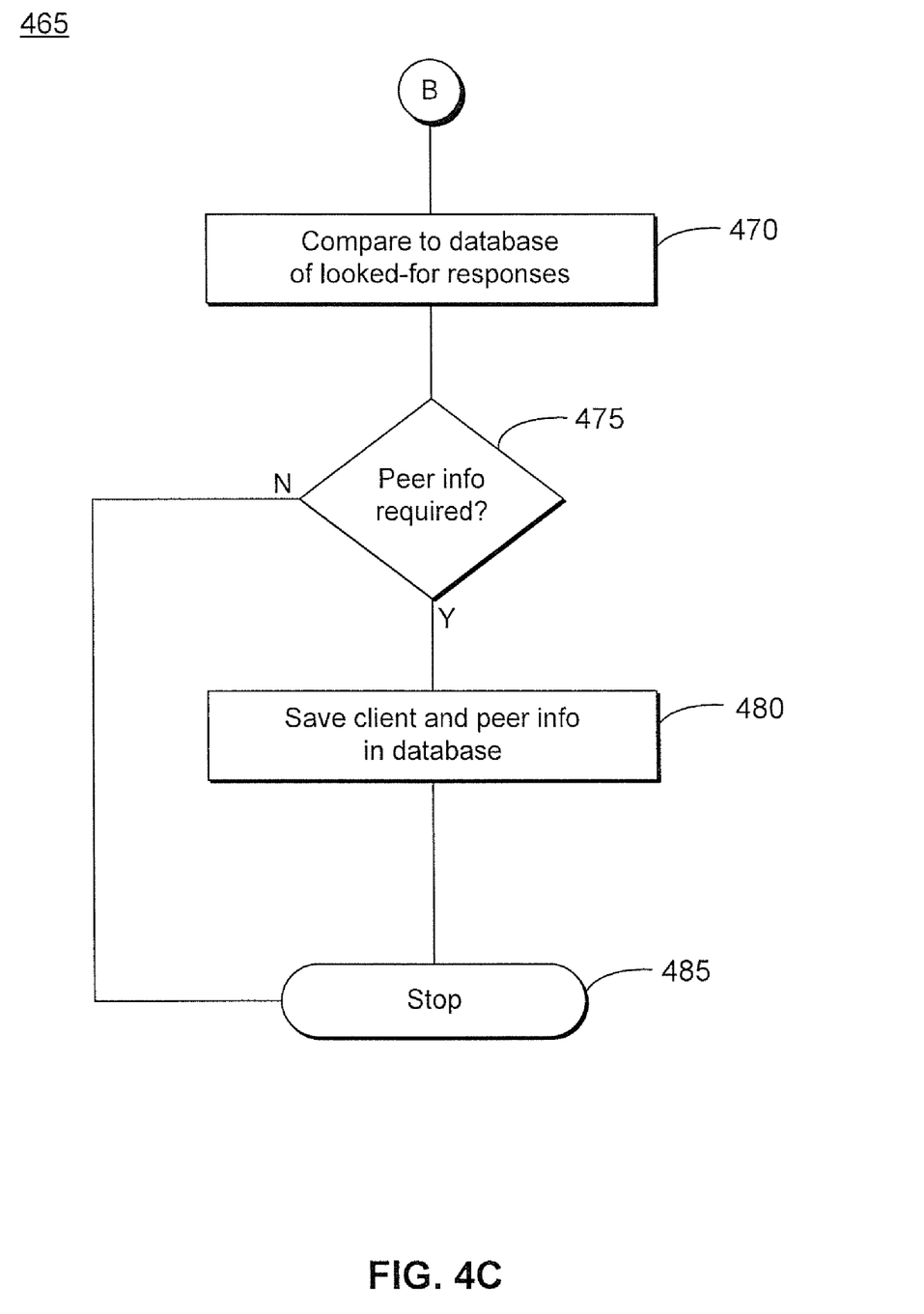
FIG. 4C is a flowchart of an exemplary method of processing a reply including peer location information transmitted from a P2P central entity to a P2P client.

FIG. 4C is a flowchart of an exemplary method 465 of processing a reply including peer location information transmitted from a P2P central entity 150 to a P2P client 110. As indicated above, the processing of exemplary method 465 may begin upon a determination in decision step 430 of FIG. 4A that the packets relate to a reply including peer location information.

In step 470, DPI B 136 compares the reply to the database of looked-for responses. In particular, DPI B 136 may attempt to correlate the reply transmitted by a P2P central entity 150 to a request previously transmitted by a P2P client 110. In making this determination, DPI B 136 may consider, for example, the fields, source, and destination of the detected reply, and the fields, source, and destination of any requests stored in key storage module 138. Other factors used in correlating a request to a reply will be apparent to those of skill in the art based on knowledge of the underlying protocol.

Exemplary method 465 then proceeds to decision step 475, where DPI B 136 determines whether peer information should be extracted from the reply based on the comparison in step 470. In particular, when DPI B 136 successfully correlates the reply to a previously-detected request for which peer information is required, exemplary method 465 proceeds to step 480. Alternatively, when DPI B 136 is unable to correlate the reply to a request, exemplary method 465 proceeds directly to step 485, where exemplary method 465 stops.

In step 480, DPI B 136 extracts the peer information of one or more P2P client peers 160 from the reply. The peer information may include, for example, the IP address and port of each P2P client peer 160 that maintains the P2P content item corresponding to the key included in the initial request.

It should be apparent that, DPI B 136 may need to inspect multiple packets in order to extract the peer information from the IP flow. Thus, DPI B 136 may cache packets, such that multiple packets are used in extracting peer information. Furthermore, in some circumstances, DPI B 136 may need to wait until the IP flow is complete before it is able to extract the peer information. As stated above, in implementations in which DPI B 136 receives packets from DPI A 134 before the IP flow is positively identified as P2P, DPI B 136 may remove packets from the cache upon identification of the IP flow as non-P2P.

After extraction of the peer information from one or more packets, DPI B 136 may then store the P2P client 110 and P2P client peer 160 information in key storage module 138 using, for example, data arrangement 200, described in further detail above with reference to FIG. 2. Exemplary method 465 then proceeds to step 485, where exemplary method 465 stops.

Figure 5:
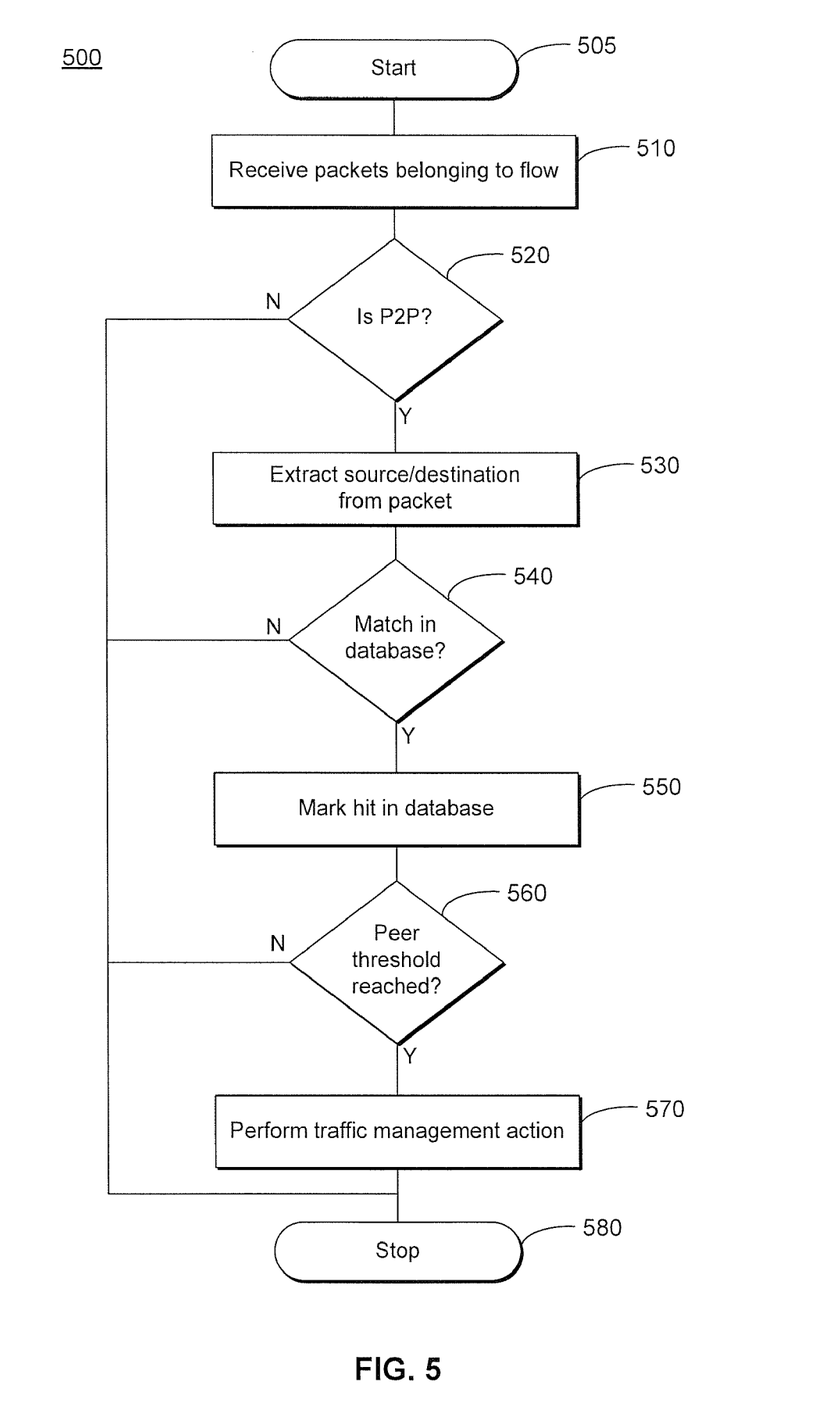
FIG. 5 is a flowchart of an exemplary method for identifying and managing P2P data exchanges between a P2P client and one or more P2P client peers.

FIG. 5 is a flowchart of an exemplary method 500 for identifying and managing P2P data exchanges between a P2P client 110 and one or more P2P client peers 160. Exemplary method 500 may be performed by the components of networks 100a, 100b to manage, for example, P2P transmissions between a P2P client 110 and a P2P client peer 160. Again, although the steps of method 500 are described as performed by one or more components of networks 100a, 100b, the processing may be distributed in a different manner, as will be apparent to those of skill in the art.

Exemplary method 500 starts in step 505 and proceeds to step 510, where network element 130a, 130b receives a plurality of packets belonging to a flow. As an example, network element 130a, 130b may receive a number of packets belonging to a IP flow between a P2P client 110 and a P2P client peer 160. The packets in the IP flow could be related to, for example, a control exchange used to establish a connection between a P2P client 110 and P2P client peer 160. Alternatively, the packets could be packets containing the P2P content exchanged between the P2P client 110 and P2P client peer 160. It should be apparent that the contents of these packets may be encrypted.

Exemplary method 500 then proceeds to decision step 520, where DPI A 134 determines whether the application protocol associated with the IP flow is a P2P protocol. In making this determination, DPI A 134 may first identify an application protocol associated with the IP flow using one or more packets belonging to the flow. In particular, as will be apparent to those of skill in the art, DPI A 134 may analyze any combination of information contained in OSI Layers 2 through 7 of the packets to extract an application protocol associated with the IP flow or other flows related to the P2P application.

When, in an optional decision step 520, DPI A 134 determines that the application protocol associated with the IP flow is not a P2P protocol, exemplary method 500 proceeds to step 580, where exemplary method 500 stops. Alternatively, when, in decision step 520, DPI A 134 determines that the application protocol associated with the IP flow is a P2P protocol, exemplary method proceeds to step 530.

In step 530, DPI A 134, or another network element performing this function, extracts the source and destination information from one or more of the packets. In particular, DPI A 134 may extract the source IP address, source port, destination IP address, and destination port from the packet. Exemplary method 500 then proceeds to decision step 540.

In decision step 540, DPI A 134 determines whether the source and destination in the packet match an entry in key storage module 138. For example, DPI A 134 may access data arrangement 200 in key storage module 138 to determine whether the source corresponds to an entry in peer information field 230 for a given key and whether the destination corresponds to an entry in client information field 220 for the same key. When DPI A 134 does not detect a match, exemplary method 500 proceeds to step 580, where method 500 stops. Alternatively, when DPI A 134 detects a match in key storage module 138, exemplary method 500 proceeds to step 550.

In step 550, DPI A 134 places a mark in key storage module 138 indicating that a suspected P2P transfer has occurred involving the P2P content key. As an example, DPI A 134 may increment a counter associated with the entry in data arrangement 200, the counter indicating the total number of matches found. Alternatively, to avoid incrementing the counter more than once for each P2P client-peer pair 110, 160, DPI A 134 may associate a marking, such as a Boolean value, with the particular peer 160 involved in the transfer. In this manner, DPI A 134 may keep track of all suspected P2P transfers involving the key. Exemplary method 500 then proceeds to decision step 560.

In decision step 560, DPI A 134 determines whether the number of peer markings for the particular client/key pair has reached a predetermined threshold. This threshold may be specified by a user and may be, for example, a total number of markings or a percentage of markings. It should be apparent that the threshold could be, for example, only one marking. Alternatively, to increase the certainty of the decision that a P2P content transfer is occurring, the threshold could be set for a particular client/key pair to require transfers to multiple listed P2P client peers 160. As another alternative, as mentioned above, the threshold could be set to, for example, fifty percent, such that the threshold is only reached when the number of markings is more than half of the number of peers 160 for the particular client/key pair. The number of peers may be determined, for example, by inspecting the corresponding entry in data arrangement 200.

When, in decision step 560, DPI A 134 determines that the threshold has not been reached, exemplary method 500 proceeds to step 580, where method 500 stops. Alternatively, when DPI A 134 determines that the threshold has been reached, exemplary method 500 proceeds to step 570.

In step 570, DPI A 134 performs a traffic management action on the IP flow based on a query to key storage module 138. In particular, DPI A 134 may query data arrangement 300 of key storage module 138 using the key to retrieve the corresponding traffic management action 330 to be performed on the flow. Network elements 130a, 130b, or one of the components therein, may then perform the retrieved traffic management function.

As will be apparent to those of ordinary skill in the art, any appropriate traffic management action may be performed in response to an inference that the P2P client 110 is a party to a P2P transfer involving an identified key. As an example, network elements 130a, 130b may transmit a notification to a network management entity indicating that a transfer involving the P2P content item corresponding to the key has occurred. The network management entity may then take appropriate action, such as defining a further action to take place or notifying the copyright owner.

As a number of other examples, network elements 130a, 130b may drop all packets belonging to the flows between P2P client 110 and P2P client peers 160, redirect packets belonging to the flows along a different route, modify bandwidth available to the flows, and change a Quality of Service (QoS) marking associated with packets belonging to the flows. In addition to performing these actions on the IP flow itself, network element 130a may perform these actions on all of the client's traffic or a class of the client's traffic (e.g. all P2P transfers). After performing the traffic management action on the flow, exemplary method 500 proceeds to step 580, where exemplary method 500 stops.

According to the foregoing, various exemplary embodiments enable content-specific management of P2P transfers over a network, even when the transfers between the client and peers are encrypted. In particular, by extracting peer information from a response sent by a central entity, a DPI-equipped network element may monitor for subsequent transfers of data between the client and the peers, and then regulate such transfers. Thus, the various exemplary embodiments enable a service provider or other entity to preserve bandwidth and maintain the Quality of Experience for all users, while recognizing the legitimate uses of P2P transfers.

Related techniques for monitoring and managing P2P transfers are detailed in the following co-pending applications, each of which is incorporated by reference herein: Application Serial No. 12/371,197. "Peer-to-Peer Traffic Management Based on Key Presence in Peer-to-Peer Data Transfers" to Dolganow et al.; and application Ser. No. 12/371,261. "Inline Key-Based Peer-to-Peer Processing" to Dolganow et al.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method for managing transmission of peer-to-peer content over a telecommunications network, the method comprising:
    receiving a first plurality of packets transmitted between a peer-to-peer (P2P) client and a P2P central entity, the first plurality of packets received in a network element in the telecommunications network;
    performing deep packet inspection (DPI) to extract a key from one or more of the first plurality of packets, the key identifying a P2P content item;
    receiving a second plurality of packets transmitted between the P2P central entity and the P2P client, the second plurality of packets received in the network element;
    performing DPI to extract location information of a plurality of P2P peers from one or more of the second plurality of packets;
    detecting at least one subsequent IP flow between the P2P client and the plurality of P2P peers using the extracted location information, the at least one subsequent IP flow relating to a transfer of the P2P content item, comprising
        detecting a plurality of subsequent IP flows, each subsequent IP flow relating to a transfer of the P2P content item between the P2P client and a respective P2P peer of the plurality of P2P peers, and
        placing a marking in a database upon detection of each subsequent IP flow; and
    performing, upon detection of the at least one subsequent IP flow between the P2P client and the at least one P2P peer, a traffic management action on the at least one subsequent IP flow, wherein the step of performing a traffic management action is only performed when a total number of markings in the database divided by a total number of P2P peers exceeds a predetermined threshold.

2. The method for managing transmission of peer-to-peer content according to claim 1, wherein the first plurality of packets relate to a request for peer location information transmitted from the P2P client to the P2P central entity, the request for peer location information including the key.

3. The method for managing transmission of peer-to-peer content according to claim 2, wherein the second plurality of packets relate to a reply transmitted from the P2P central entity to the P2P client, the reply including the requested peer location information.

4. The method for managing transmission of peer-to-peer content according to claim 1, the method further comprising:
    upon extraction of the key from one or more of the first plurality of packets, determining whether the key is present in a P2P content database; and when the key is present in the P2P content database, determining that a subsequent extraction of peer location information is required.

5. The method for managing transmission of peer-to-peer content according to claim 1, wherein:
the at least one subsequent IP flow between the P2P client and the plurality of P2P peers includes a third plurality of packets, and
contents of the third plurality of packets are encrypted.

6. The method of managing transmission of peer-to-peer content according to claim 1, wherein the step of performing a traffic management action is only performed when a total number of markings in the database exceeds a predetermined threshold.

7. The method for managing transmission of peer-to-peer content according to claim 1, the method further comprising:
determining the traffic management action by querying a P2P content database using the key, the P2P content database maintaining a mapping between keys and corresponding traffic management actions.

8. The method for managing transmission of peer-to-peer content according to claim 1, wherein the traffic management action comprises notifying a network management entity that a transfer involving the P2P content item has occurred.

9. The method for managing transmission of peer-to-peer content according to claim 1, wherein the traffic management action comprises at least one of:
dropping packets belonging to the at least one subsequent flow,
redirecting packets belonging to the at least one subsequent flow,
modifying bandwidth available to the at least one subsequent flow, and
changing a Quality of Service for packets belonging to the at least one subsequent flow.

10. The method for managing transmission of peer-to-peer content according to claim 1, wherein the P2P client, the P2P central entity, and the plurality of P2P peers communicate using the BitTorrent protocol and the key is an info_hash parameter that uniquely identifies the P2P content item.

11. A system for managing transmission of peer-to-peer content over a telecommunications network, the system comprising:
a network element configured to receive a first plurality of packets and a second plurality of packets, wherein the first and the second plurality of packets are transmitted between a peer-to-peer (P2P) client and a P2P central entity; and
at least one deep packet inspection (DPI) device adapted to:
perform DPI to extract a key from one or more of the first plurality of packets, the key identifying a P2P content item,
perform DPI to extract location information of at least one P2P peer from one or more of the second plurality of packets,
detect at least one subsequent IP flow between the P2P client and the at least one P2P peer using the extracted location information, the at least one subsequent IP flow relating to a transfer of the P2P content item, and
notify the network element, upon detection of the at least one subsequent IP flow between the P2P client and the at least one P2P peer, to perform a traffic management action on the at least one subsequent IP flow,
wherein the at least one DPI device comprises a first DPI device and a second DPI device and wherein the first DPI device is located in the network element and the second DPI device is a standalone device connected to the network element.

12. The system for managing transmission of peer-to-peer content according to claim 11, wherein the first plurality of packets relate to a request for peer location information transmitted from the P2P client to the P2P central entity, the request for peer location information including the key.

13. The system for managing transmission of peer-to-peer content according to claim 12, wherein the second plurality of packets relate to a reply transmitted from the P2P central entity to the P2P client, the reply including the requested peer location information.

14. The system for managing transmission of peer-to-peer content according to claim 11, further comprising a key storage module maintaining peer-to-peer (P2P) content keys, each key uniquely identifying a P2P content item, wherein the at least one DPI device is further adapted to:
upon extraction of the key from one or more of the first plurality of packets, determine whether the key is present in the P2P content database, and
when the key is present in the P2P content database, determine that a subsequent extraction of peer location information is required.

15. The system for managing transmission of peer-to-peer content according to claim 11, wherein:
the at least one subsequent IP flow between the P2P client and the at least one P2P peer includes a third plurality of packets, and
contents of the third plurality of packets are encrypted.

16. The system for managing transmission of peer-to-peer content according to claim 11, wherein the at least one P2P peer is a plurality of P2P peers and the at least one DPI device is adapted to:
detect a plurality of subsequent flows, each subsequent IP flow relating to a transfer, of the P2P content item between the P2P client and a respective P2P peer of the plurality of P2P peers;
place a marking in a key storage module upon detection of each subsequent flow, and
notify the network element to perform a traffic management action only when a total number of markings in the database exceeds a predetermined threshold.

17. The system for managing transmission of peer-to-peer content according to claim 11, wherein the traffic management action comprises notifying a network management entity that a transfer involving the P2P content item has occurred.

18. The system for managing transmission of peer-to-peer content according to claim 11, wherein the first DPI device mirrors the one or more of the first plurality of packets containing the key to the second DPI device.

19. The system for managing transmission of peer-to-peer content according to claim 11, wherein the first DPI device redirects the one or more of the first plurality of packets containing the key to the second DPI device.

20. A method for managing transmission of peer-to-peer content over a telecommunications network, the method comprising:
receiving a first plurality of packets transmitted between a peer-to-peer (P2P) client and a P2P central entity, the first plurality of packets received in a network element in the telecommunications network, wherein the network element includes a first deep packet inspection (DPI) device;
performing, at a second DPI device, DPI to extract a key from one or more of the first plurality of packets, the key identifying a P2P content item, wherein the second DPI device is a standalone device connected to the network element;

receiving a second plurality of packets transmitted between the P2P central entity and the P2P client, the second plurality of packets received in the network element;

performing DPI to extract location information of at least one P2P peer from one or more of the second plurality of packets;

detecting at least one subsequent IP flow between the P2P client and the at least one P2P peer using the extracted location information, the at least one subsequent IP flow relating to a transfer of the P2P content item; and performing, upon detection of the at least one subsequent IP flow between the P2P client and the at least one P2P peer, a traffic management action on the at least one subsequent IP flow.

* * * * *